United States Patent
Bansal et al.

(10) Patent No.: US 11,080,617 B1
(45) Date of Patent: Aug. 3, 2021

(54) PRESERVATION OF CAUSAL INFORMATION FOR MACHINE LEARNING

(71) Applicant: PayPal, Inc., San Jose, CA (US)

(72) Inventors: Amit Bansal, Sunnyvale, CA (US); Thomas Rosati, Towson, MD (US); Tittu Nellimoottil, Sunnyvale, CA (US)

(73) Assignee: PayPal, Inc., San Jose, CA (US)

( * ) Notice: Subject to any disclaimer, the term of this patent is extended or adjusted under 35 U.S.C. 154(b) by 902 days.

(21) Appl. No.: 15/803,511

(22) Filed: Nov. 3, 2017

(51) Int. Cl.
| | |
|---|---|
| *G06N 20/00* | (2019.01) |
| *G06F 11/34* | (2006.01) |
| *G06F 11/30* | (2006.01) |
| *G06F 16/23* | (2019.01) |
| *G06F 16/2455* | (2019.01) |

(52) U.S. Cl.
CPC ......... *G06N 20/00* (2019.01); *G06F 11/3089* (2013.01); *G06F 11/3438* (2013.01); *G06F 16/235* (2019.01); *G06F 16/24568* (2019.01)

(58) Field of Classification Search
CPC . G06N 20/00; G06F 16/24568; G06F 16/235; G06F 11/3089; G06F 11/3438
USPC .......................................................... 706/12
See application file for complete search history.

(56) References Cited

U.S. PATENT DOCUMENTS

| | | | | |
|---|---|---|---|---|
| 6,675,145 B1* | 1/2004 | Yehia | ...................... | G10L 21/06 704/270 |
| 7,711,663 B2* | 5/2010 | Weng | ...................... | G06N 3/08 706/14 |
| 8,762,272 B1* | 6/2014 | Cozens | ................ | G06Q 20/223 705/40 |
| 2012/0254092 A1* | 10/2012 | Malov | ................ | G06Q 30/0201 706/52 |
| 2014/0081832 A1* | 3/2014 | Merrill | ................... | G06Q 40/02 705/38 |
| 2014/0257924 A1* | 9/2014 | Xie | ...................... | G06Q 10/067 705/7.31 |
| 2015/0170066 A1* | 6/2015 | Pawar | .................. | G06Q 10/063 705/7.11 |

(Continued)

OTHER PUBLICATIONS

Desai, D.K. Sreekantha & Kulkarni, Raja. Expert system design for credit risk evaluation using neuro-fuzzy logic. (2010). 2010 Blackwell Publishing Ltd. (Year: 2010).*

(Continued)

*Primary Examiner* — Vincent Gonzales
(74) *Attorney, Agent, or Firm* — Haynes and Boone, LLP (57) ABSTRACT

Machine learning models are powerful artificial intelligence tools that can make determinations based on a variety of factors. Unlike a simple linear model, however, determining the contribution of each variable to the outcome of a machine learning model is a challenging task. It may be unclear which factors contributed heavily toward a particular outcome of the machine learning model and which factors did not have a major effect on the outcome. Being able to accurately determine the underlying causative factors for a machine learning-based decision, however, can be important in several contexts. The present disclosure describes techniques that allow for training and use of non-linear machine learning models, while also preserving causal information for outputs of the models. Relative weight calculations for machine learning model variables can be used to accomplish this, in various embodiments.

20 Claims, 4 Drawing Sheets

(56) References Cited

U.S. PATENT DOCUMENTS

2016/0379092 A1\* 12/2016 Kutliroff ............ G06K 9/00664
                                                382/158
2016/0379303 A1\* 12/2016 Reich ................. G06Q 40/025
                                                705/38

OTHER PUBLICATIONS

Delpisheh, Elnaz.Two new approaches to evaluate association rules. (2010).University of Lethbridge. Faculty of Arts and Science. viii, 85 leaves. (Year: 2010).\*
Chalupka, K., F. Eberhardt, and P. Perona, "Causal feature learning: an overview", Behaviormetrika 44, 2017, pp. 137-164. (Year: 2017).\*
Paul, M. "Feature selection as causal inference: experiments with text classification", Proc. 21st Conf. on Computational Natural Language Learning, Aug. 3-4, 2017, pp. 163-172. (Year: 2017).\*
Guyon, I., C. Aliferis, and A. Elisseeff, "Causal feature selection", in H. Liu and H. Motoda, eds., Computational Methods of Feature Selection, Chapman and Hall/CRC Press, 2007, 23 pages. (Year: 2007).\*
Drucker, H. and C. Cortes, "Boosting Decision Trees", Neural Information Processing 8, NIPS-8 1996, MIT Press, pp. 470-485. (Year: 1996).\*

\* cited by examiner

| Event ID | Account ID | Type | IP Address | Transaction Amt | Timestamp |
|---|---|---|---|---|---|
| 798744654 | 1234 | Debit | 173.0.88.2 | $5.48 | 20170428134751 |
| 345235896 | 5678 | ACH | 172.217.11.228 | $89.98 | 20170301002133 |
| 563454210 | 7890 | Balance | 128.42.206.11 | $2.00 | 20161225200205 |
| 98234771 | 5678 | CC | 104.20.84.19 | $323.42 | 20170301000917 |

202    204    206    208    210    212

Records 200

PRESERVATION OF CAUSAL INFORMATION FOR MACHINE LEARNING

TECHNICAL FIELD

This disclosure relates to data processing using machine learning and artificial intelligence. More particularly, this disclosure relates to a particular machine learning architecture that allows for preservation of causal information related to outcomes from an artificial intelligence model.

BACKGROUND

Machine learning can be used to reach a determination regarding various input data. A trained machine learning model, for example, can be used to reach a decision and/or answer a question such as "does this email appear to be unsolicited commercial email (e.g. spam)" or "does this picture contain an image of an automobile?"

Machine learning models, however, may take into account many different factors when reaching a determination. Frequently, the internal effects of variables that are used to reach an ultimate decision by the machine learning model can be difficult or impossible to ascertain with accuracy. For example, it may not be apparent that a specific image was determined to contain an automobile based on some particular portion of the image (e.g. front headlights) more than some other particular portion (e.g. the windshield). While machine learning can therefore help automate decision making, the reasons a particular automated decision was made are often unclear.

DETAILED DESCRIPTION

When a machine learning model reaches a decision, it may be important to know the importance of various factors that led to the decision. Thus, it can be desirable to know, out of a number of different data feature values, which one(s) contributed most to a decision made by the machine learning model.

In a simple linear model, it may be relatively easy to determine the influence of different factors (e.g. data feature values) on the outcome of the model. For example, a linear model may take the form of:

$$\text{RESULT} = A_0 + (A_1 X_1) + (A_2 X_2) + \ldots + (A_n X_n)$$

In this formula, each of the "A" values is a static weighting, and each of the "X" values belongs to a particular sample data feature value. The contribution of variable 1 toward the model result can be measured as $A_1(X_1 - X_1^{AVG})$, where $X_1^{AVG}$ is an average feature value for a population. In this example, a value of $X_1$ that is below the average feature value will result in a negative relative weighting, while a value of $X_1$ above the average feature value will result in a positive relative weighting.

Thus, in the case of a linear model, it can be straightforward to determine how much influence different data feature values have (e.g., how much does each feature value deviate from an average and what is the resulting effect on the output of the linear model). In machine learning models, however, the complex operations engaged in by the models mean that detecting the influence of a particular data feature value is not so simple, as these models tend to operate in a non-linear fashion. Machine learning models may include models implemented using an artificial neural network (ANN), gradient boosting trees (GBT), and random forest (though are not limited to these examples).

In some instances, such as adverse credit actions, however, it is a legal requirement that a consumer is informed of one or more reasons why the consumer had an adverse action taken against them (e.g., declined for an application to acquire a new source of credit). Thus, if a machine learning model is used to make a credit decision in certain jurisdictions, it may be necessary to provide reasons that a consumer was rejected. But the inner workings of a machine learning model can obscure the decision making process, leading to difficulty in determining why the model might reject a particular credit applicant.

One potentially flawed approach used by some is to utilize a machine learning model to reach a decision, but then use a linear model to provide accountability for rejection reasons. Such an approach is problematic, however, as the two models will operate differently—and the factors that drive a decision by the machine learning model may not be identical to the factors indicated as being the most influential by the linear model. Further, this approach also requires more overhead, since the two different models may require separate maintenance and updating (which could even lead to the two models further diverging over time).

The present disclosure, however, allows for the use of advanced machine learning techniques while still preserving underlying causal information for an outcome from a machine learning model. As explained below, the significance of each variable for a machine learning model can be determined by computing a relative weight (RW) for that variable—e.g., a measure of model error that occurs based on that variable. The larger the error in the result produced by the model, the more powerful that variable is in various embodiments.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
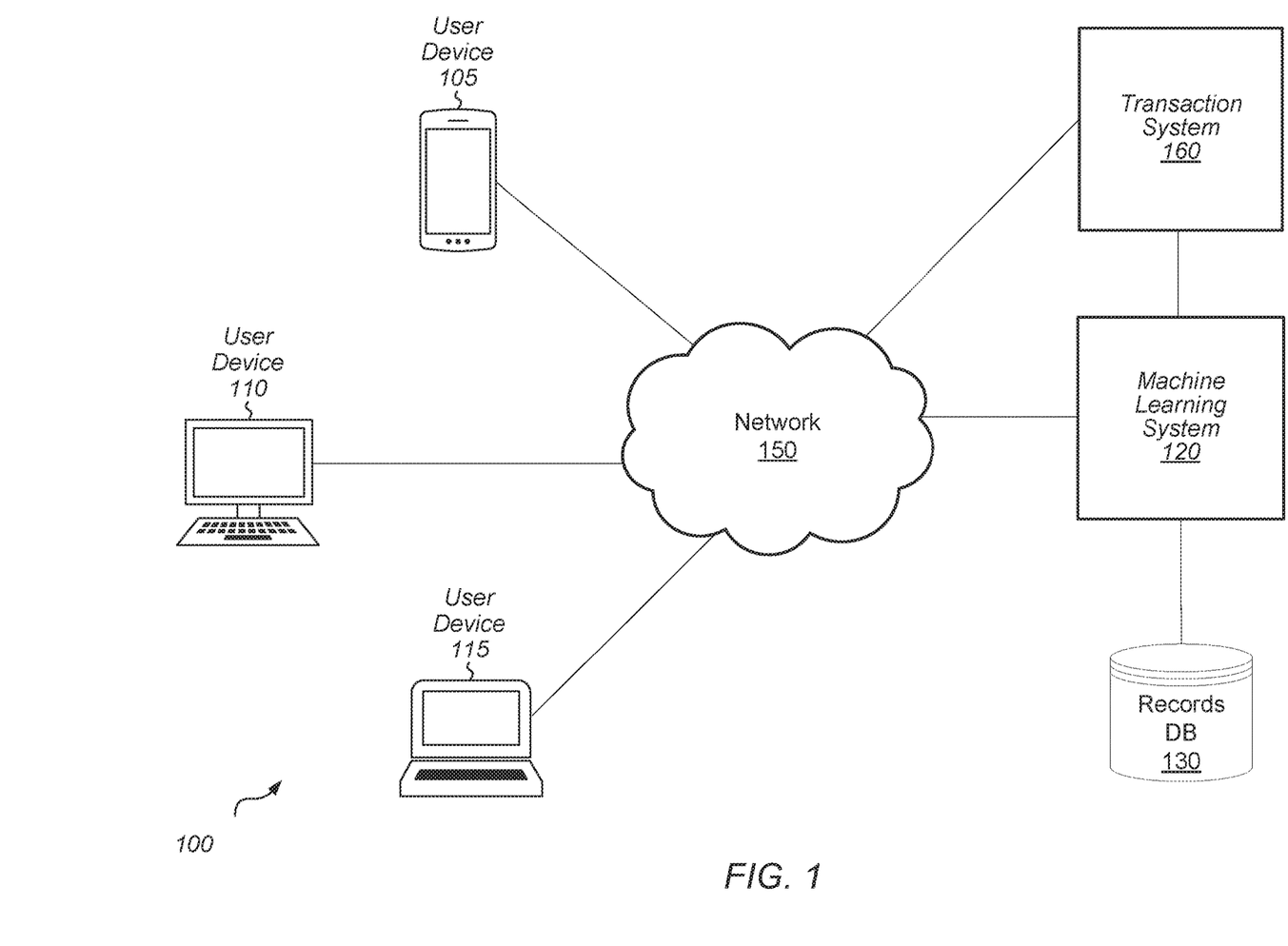
FIG. 1 illustrates a block diagram of a system that includes users devices, a machine learning system, a transaction system, a network, and a records database according to some embodiments.

Turning to FIG. 1, a block diagram of a system 100 is shown. In this diagram, system 100 includes user devices 105, 110, 115, a machine learning system 120, a transaction system 160, and a network 150. Also depicted is records DB (database) 130. Note that other permutations of this figure are contemplated (as with all figures). While certain connections are shown (e.g. data link connections) between different components, in various embodiments, additional connections and/or components may exist that are not depicted. Further, components may be combined with one other and/or separated into one or more systems.

User devices 105, 110, and 115 may be any type of computing device. Thus, these devices can be a smartphone, laptop computer, desktop computer, tablet computer, etc. As discussed below, user devices such as 105, 110, and 115 may engage in various actions, including transactions, using transaction system 160. Machine learning system 120 may comprise one or more computing devices each having a processor and a memory, as may transaction system 160. Network 150 may comprise all or a portion of the Internet.

In various embodiments, machine learning system 120 can take operations related to creating, training, and executing a machine learning model usable to make various predictions, including a prediction of creditworthiness for applicants applying for new amounts of credit. Note that different aspects of operations described relative to machine learning system 120 (as well as other systems described herein) can be performed by two or more different computer systems in some embodiments. Machine learning system 120 may be controlled by an entity who provides an electronically provided service, which may be an electronic transaction payment service in some instances (allowing for transfer of currency or other items).

Transaction system 160 may correspond to an electronic payment service such as that provided by PayPal™. Transaction system 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices 105, 110, and 115 can be used to access electronic payment accounts such as those provided by PayPal™. In various embodiments, quantities other than currency may be exchanged via transaction system 160, including but not limited to stocks, commodities, gift cards, incentive points (e.g. from airlines or hotels), etc.

Records database (DB) 130 includes records related to various users. These may be users of transaction system 160 in some instances and can include any number of details, such as any information related to a transaction or to an action taken by a user on a web page or an application installed on a computing device (e.g., the PayPal app on a smartphone). Many or all of the records in records database 130 are transaction records including details of a user sending or receiving currency (or some other quantity, such as credit card award points, cryptocurrency, etc.).

Information from records DB 130 can be used by machine learning system 120 to train and/or execute a machine learning model. In other cases, additional data sources not depicted may also be used by machine learning system 120 (e.g. credit bureau information or other accessible databases).

Figure 2:
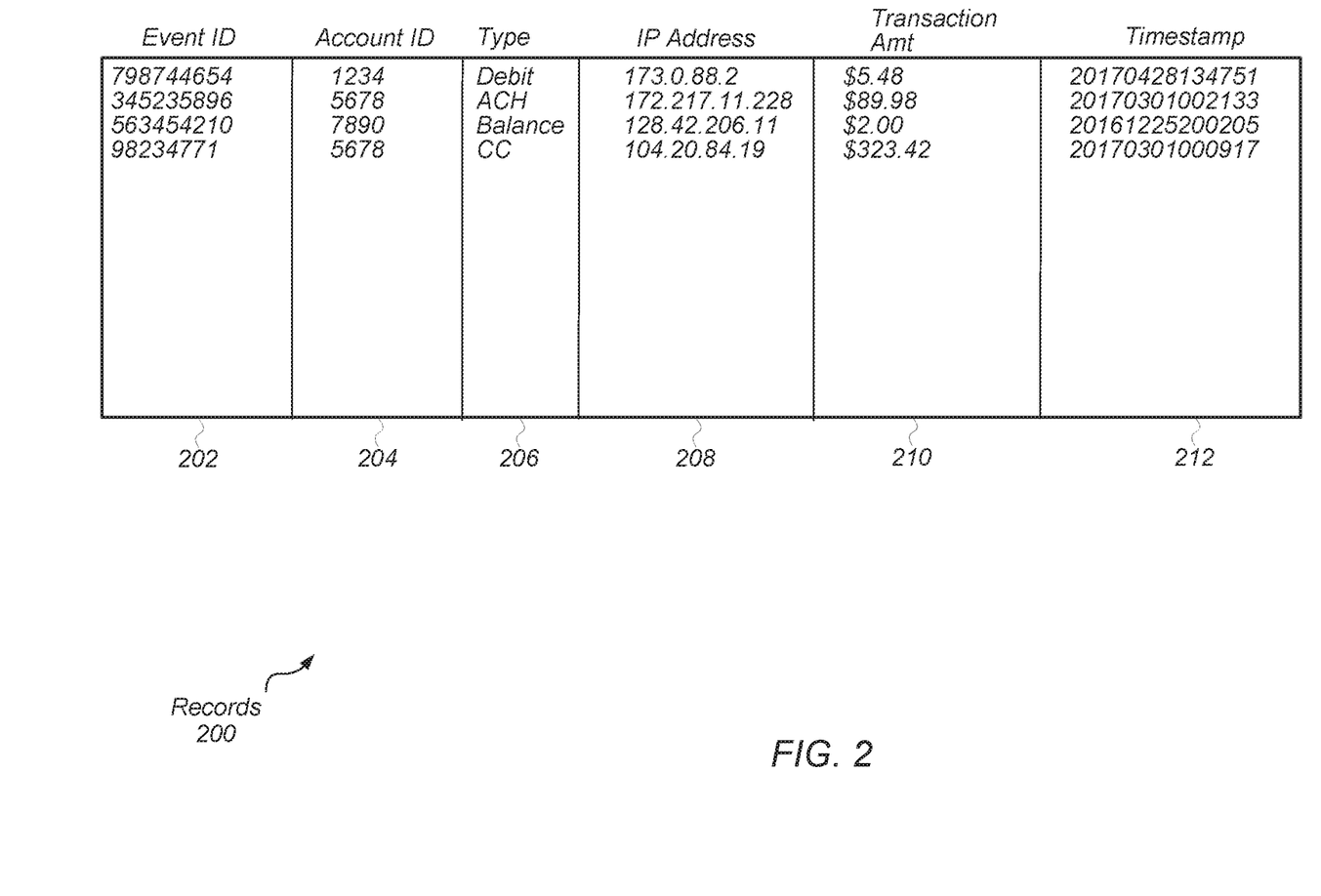
FIG. 2 illustrates a block diagram of a set of data records, according to some embodiments.

Turning to FIG. 2, a block diagram is shown of one embodiment of records 200. These records may be contained in records database 130, for example. In this example, the records shown include various charges made by different funding mechanisms.

As shown, field 202 includes an event ID. This may be a globally unique event identifier within an enterprise associated with transaction system 160. Thus, in one embodiment, the event ID in field 202 includes a unique ID for each of millions of electronic payment transactions processed by a service provider such as PayPal™. Field 204 includes a unique account ID for a user.

Field 206 includes type of transaction. In this example, rows 1 and 4 are a credit card ("CC") funded transaction, while row 2 is an Automated Clearinghouse (ACH) funded transaction. Row 3 is a balance funded transaction (e.g. a user had a pre-existing currency balance in her account that was used to pay another entity). Additional types of transactions and/or more specific information is also possible in various embodiments (e.g., different types of credit card networks could be specified, such as VISA™ or MASTERCARD™).

Fields 208 and 210 represent an IP address date and a transaction amount (which may be specified in a particular currency such as US Dollars, Great Britain Pounds, etc.). The IP address might be the IP address of the user at the time the transaction was conducted, for example. Field 212 includes a transaction timestamp. In the examples shown, the timestamps are in the format (year) (two-digit month) (two-digit day) (hour) (minute) (seconds), but may be in any other format in various embodiments.

Many additional pieces of information may be present in records database 130 in various embodiments. An email address associated with an account (e.g. which can be used to direct an electronic payment to a particular account using only that email address) can be listed. Home address, phone number, and any number of other personal details can be listed. Further, in various embodiments, databases may include event information on actions associated payment transaction, such as actions taken relative to a website, or relative to an application installed on a device such as the PayPal application on a smartphone. Database information can therefore include web pages visited (e.g., did a user travel to www.PayPal.com www.eBay.com, or from some other domain?), order in which the pages were visited, navigation information, etc. Database information can include actions taken within an application on a smartphone such as the PayPal™ app. Database information can also include a location of where a user has logged into (authenticated) an account; unsuccessful login attempts (including IP address etc.); time of day and/or date of week for any event mentioned herein; funding sources added or removed and accompanying details (e.g. adding a bank account to allow currency to be added to or withdrawn from a user account), address or other account information changes, etc. Reversal status of a transaction (e.g. not reversed, reversed due to fraud, reversed due to NSF, etc.). In other words, a large variety of information can be present and used by machine learning system 120. Furthermore, as noted above, other data sources beyond records DB 200 may be used by machine learning system. Information about a user (home address, places of employment, salary, etc., can be used). In some cases an external database can provide additional information and/or such information can be provided by a user herself.

Figure 3:
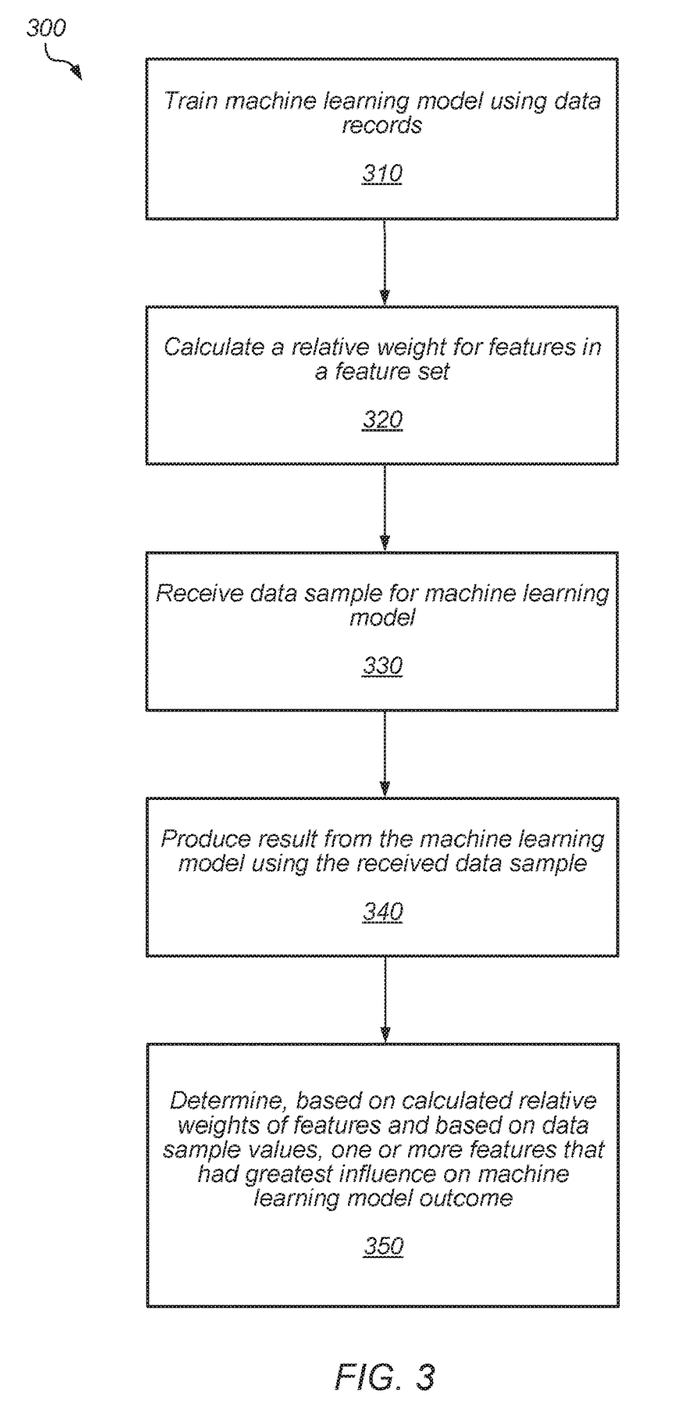
FIG. 3 illustrates a flow diagram of a method that relates to training and operating a machine learning model while preserving underlying causative information for a prediction made by the machine learning model, according to some embodiments.

Turning now to FIG. 3, a flow diagram is shown illustrating one embodiment of a method 300 that relates to training and operating a machine learning model while preserving underlying causative information for a prediction made by the machine learning model, in various embodiments. This artificial intelligence system architecture may be used to analyze a variety of data, including but not limited to electronic payment transaction data, credit bureau data, and other data usable to reach a decision on whether to approve a request for new credit.

Operations described relative to FIG. 3 may be performed, in various embodiments, by any suitable computer system and/or combination of computer systems, including machine learning system 120 and/or transaction system 160. For convenience and ease of explanation, however, operations described below will simply be discussed relative to machine learning system 120. Further, various elements of operations discussed below may be modified, omitted, and/or used in a different manner or different order than that indicated. Thus, in some embodiments, machine learning system 120 may perform one or more aspects described below, while transaction system 160 (or another system) might perform one or more other aspects.

In operation 310, machine learning system 120 trains a machine learning model using a plurality of data records, in various embodiments. These records may each contain a respective plurality of data values for a feature set having a plurality of features.

Operation 310 thus may include taking data with a known outcome and using that data to train a machine learning model. For example, in the case of credit decisions, input data may include past electronic payment transactions (e.g. as made using an electronic payment service such as that provided by PayPal™), as well as information on other past lines of credit (e.g. car loans, credit card accounts, store credit accounts, home mortgage loans, commercial loans, etc.). The information may include loan history, payment amounts, late payments, non-payments, etc. Other information can also include salary/income information, geographic information, etc. In some cases, a credit score (which can be provided by an outside party) may be used as input for a machine learning model. Additionally, note that information used to make credit decisions may be constrained by law in some cases, and certain information may be excluded or included for credit decisions based on applicable statute or regulations.

Training a credit approval machine learning model can include taking the information that was known about an applicant at the time the applicant applied for credit, and having the model make a prediction about the applicant's future payments for the new credit. E.g., someone who was granted credit 12 or 24 months ago could be analyzed to determine if they made on-time payments, stayed below credit limits, etc. Prediction by the model can then be compared to actual payment history for the credit that was granted to determine how accurate the model predicted the performance of the applicant for that credit. This process can be repeated for large numbers of users to tune the model. Note that credit modeling can apply to both individual credit and to credit for a business, in various embodiments. In some cases, business revenues can be measured using electronic payment transaction volume to determine potential risk for credit.

The machine learning model used for operation 310 (and other operations) can be any of a variety of models, including but not limited to gradient boosting tree (GBT) models and artificial neural network (ANN) models. Test data thus can be input into a GBT model having particular internal parameters (which may be constructed/determined based on transaction and other data). Output of the GBT model having the particular internal parameters can then be repeatedly compared to known outcomes of the test data, and the GBT model can be altered based on the comparing to refine accuracy of the GBT model. For example a first decision tree can be calculated based on the known data, then a second decision tree can be calculated based on inaccuracies detected in the first decision tree. This process can be repeated, with different weighting potentially given to different trees, to produce an ensemble of trees with a refined level of accuracy significantly above what might be produced from only one or two particular trees.

In other embodiments, an artificial neural network (ANN) model is trained to produce a machine learning model. Internal parameters of the ANN model (e.g., corresponding to mathematical functions operative on individual neurons of the ANN) are then varied. Output from the ANN model is then compared to known results, during the training process, to determine one or more best performing sets of internal parameters for the ANN model. Thus, many different internal parameter settings may be used for various neurons at different layers to see which settings most accurately predict whether a particular credit decision is likely to be profitable (or at least above a certain allowable possible loss expectation). In addition to GBT and ANN models outlined above, other forms of machine learning may also be used to construct the machine learning model that is trained in operation 310.

In operation 320, machine learning system 120 calculates, for each of the features in a feature set, a relative weight for that feature, in various embodiments. This operation may allow a determination as to which features have greater or lesser effects on outcomes from a machine learning model.

Features used in machine learning models described relative to FIG. 3 can include any of the features described above as well as others—income, number of existing credit accounts, recency of existing accounts, late payments, state or prefecture of residence, number and type of electronically conducted payment transaction (e.g. credit card funded, debit card funded, ACH funded), etc.

Each of these features may have a particular effect on an outcome of the machine learning model. For example, it may be the case that a person's tendency to have late payments is more predictive, overall, for credit risk than a person's income (e.g., a person with lower income but who always pays her bills on time could be a lower credit risk than a person with higher income who frequently pays his bills late). Thus, a given feature may be strongly predictive, weakly predictive, or even non-predictive of the particular credit risk for a new credit application. (Note that in different model types, other particular features may likewise have different degrees of impact on the ultimate outcome of a model decision.)

The relative weight for each feature used by a machine learning model can be determined as a function of a modeling error for that feature. That is, an amount of induced error in a model can be measured by using a deliberately false (inaccurate) value for that feature while holding other values constant. Consider a model that uses annual salary as an input feature. The modeling error for annual salary (or any feature) can be determined by feeding a range of values into the machine learning model for that feature and measuring a variance in the output of the machine learning model based on that range.

As an example, assume a credit application with average income that is deemed to have a credit risk score of "90", as output by a machine learning model, on a 0 to 200 point arbitrary scale (100 being average risk in this case). Leaving other applicant information unchanged, a range of different income feature values could be input into the model—e.g., income of 0, income of $5,000, $10,000, . . . $100,000, $200,000, etc., up to a maximum such as $1,000,000. The variation in the effect on the credit risk score can then be measured. An income of "0" might reduce credit risk score from 90 to 78 (a −12 drop), for example, while an income of $1,000,000 or more could boost credit risk score from 90 to 95 (a +5 gain). (Note that values listed are only examples.) In this case, the modeling error from income ranges from −12 to +5, for a total range of 17 points on the 200 point scale. Thus, the relative weight of the income modeling feature can be calculated as 17/200 or 0.085. This process can be similarly repeated for other model features and ranges of values.

Note that different strategies may be employed to determine value ranges used for relative weight determination, particularly where a range could be large or unbounded. In some cases, the range could be continually expanded until the difference between the last value and the next value is marginal or non-existent. (E.g., for income, a value of $1,000,000 may be substantially the same in terms of credit risk as $1,500,000). In this case, the relative weight determination process can terminate to avoid continuing indefinitely (there may be essentially no point to trying very large incomes such as $25,000,000 a year with the model). In other instances, particular value ranges might be specified (e.g. for average length of credit card account ownership, operation 320 could simply be programmed to vary across a range of 0 years, 0 months to 20 years, 0 months). For features with fixed responses (e.g. employment status: full-time, part-time, retired, unemployed), each of the specified potential values can be used to determine a relative weight for that model feature.

Thus, after operation 320 in various embodiments, various feature in a feature set may have a calculated relative weight that indicates how much of an influence that feature has on a non-linear machine learning model.

As noted above, in a linear model, the contribution for a particular variable can be measured as:

$$A_1(X_1 - X_1^{AVG}) \qquad \text{[linear model]}$$

While in the present scheme, contribution for a variable for a non-linear machine learning model can be measured as:

$$RW_1(X_1 - X_1^{AVG}) \qquad \text{[machine learning model]}$$

where $RW_1$ is the relative weight (e.g. as calculated above) for variable 1, $X_1$ is a particular value from a particular data sample, and $X_1^{AVG}$ is an average value across an entire population. The effect of a particular feature value for an individual can thus be calculated as a function of how far it deviates from an average value in various instances. Usage of these calculated relative weights for a non-linear machine learning model is discussed further below.

In operation 330, machine learning system 120 receives a data sample for the machine learning model, according to various embodiments. This data sample may be related to an application for new credit, in some instances, and may include any number of feature data values used by the machine learning model. In some cases, the data sample may include data pulled from multiple sources. E.g., the data sample may contain applicant provided information by an applicant seeking new credit, transaction information from a database having history of electronic payment transactions, bill payment history, credit card payment history, mortgage payment history, employment database history, credit score, etc. The data sample may also include parameters for a new credit request, such as amount of credit requested (e.g. $500, $2,500,000, etc.), whether the credit is revolving (e.g. monthly credit card or other periodic payment period), repayment terms (e.g. 12 months, 60 months, etc.). In other words, generally, the data sample can include any terms applicable to a new credit application. In other instances, the data sample in operation 330 may be of a different type (e.g. in the event that the machine learning model is for something other than predicting creditworthiness).

In operation 340, machine learning system 120 produces a result from the machine learning model using the data sample received in operation 330, according to various embodiments. This operation can simply include, in various embodiments, feeding the received data sample into a trained machine learning model in order to obtain an outcome. This outcome can be, in various embodiments, a creditworthiness score on a particular scale (e.g. 1 to 1000), or other output. In some cases, an application for credit may need to pass a particular threshold for approval, and the threshold may vary depending on amount of credit requested (e.g. a lower amount of credit might require a lower score).

In operation 350, machine learning system 120 determines, based on the calculated relative weights (e.g. from operation 340) and feature values in the data sample, one or more of the feature values that had a greatest influence in the machine learning model producing the result, according to various embodiments. This operation can allow, even in a non-linear model, for determination of the most influential factors in a machine learning model reaching a decision, in various embodiments.

For example, if an applicant for new credit is declined by a machine learning model (or the machine learning model outputs a particular score that is used as a basis by another decision making system to decline the applicant), the applicant can be informed of one or several reasons having a greatest contribution to the rejection. This information may fulfil legal requirements in certain jurisdictions that an applicant cannot be denied without cause or without specific reasoning.

In the case of a model that produces a numeric outcome predictive of credit risk, feature influence could be determined by using the relative weight for that feature multiplied by the deviation from average (or some other chosen benchmark) for that feature. E.g., feature 1's influence might be −4.8, feature 2's influence might be +0.3, feature 3's influence might be −0.7, etc. These results can then be ordered and sorted to see which features had the greatest negative effect in the case of an adverse credit decision. (In some cases, it may even be the features that had the least positive effect, if there were no negative effect features.)

Thus, based on the relative weights for different variables used in the machine learning model, an applicant can be accurately informed of why the model may have led to him being rejected for credit. Such factors may include too many past due accounts, too many recent credit inquiries, too many late payments, average age of credit being too young, insufficient income, or any number of other factors. Again, note that factors not allowed by law will not be used to determine credit decisions, according to jurisdictional rules. A user may be informed of adverse credit decision factors via email, text message, phone, paper mail, or any other suitable communication medium.

Computer-Readable Medium

Figure 4:
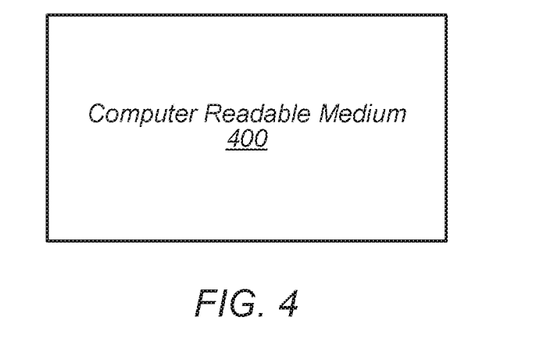
FIG. 4 is a diagram of a computer readable medium, according to some embodiments.

Turning to FIG. 4, a block diagram of one embodiment of a computer-readable medium 400 is shown. This computer-readable medium may store instructions corresponding to the operations of FIG. 3 and/or any techniques described herein. Thus, in one embodiment, instructions corresponding to machine learning system 120 may be stored on computer-readable medium 400.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

Figure 5:
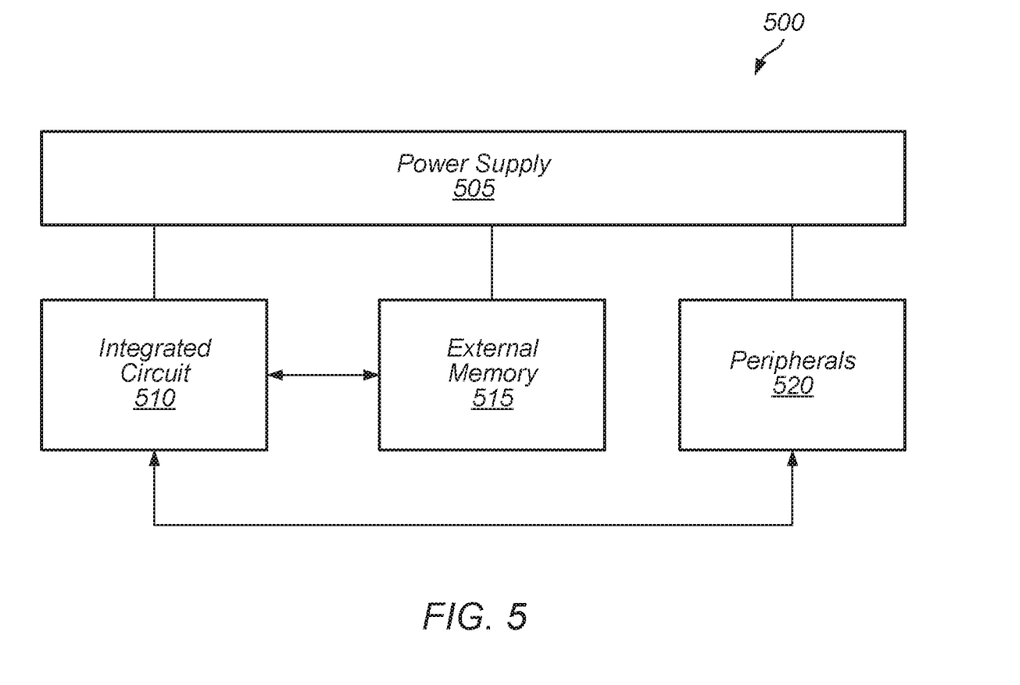
FIG. 5 is a block diagram of a system, according to some embodiments.

In FIG. 5, one embodiment of a computer system 500 is illustrated. Various embodiments of this system may be machine learning system 120, transaction system 160, or any other computer system as discussed above and herein.

In the illustrated embodiment, system 500 includes at least one instance of an integrated circuit (processor) 510 coupled to an external memory 515. The external memory 515 may form a main memory subsystem in one embodiment. The integrated circuit 510 is coupled to one or more peripherals 520 and the external memory 515. A power supply 505 is also provided which supplies one or more supply voltages to the integrated circuit 510 as well as one or more supply voltages to the memory 515 and/or the peripherals 520. In some embodiments, more than one instance of the integrated circuit 510 may be included (and more than one external memory 515 may be included as well).

The memory 515 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 510 in a chip-on-chip configuration, a package-on-package configuration, or a multi-chip module configuration.

The peripherals 520 may include any desired circuitry, depending on the type of system 500. For example, in one embodiment, the system 500 may be a mobile device (e.g. personal digital assistant (PDA), smart phone, etc.) and the peripherals 520 may include devices for various types of wireless communication, such as wife, Bluetooth, cellular, global positioning system, etc. Peripherals 520 may include one or more network access cards. The peripherals 520 may also include additional storage, including RAM storage, solid state storage, or disk storage. The peripherals 520 may include user interface devices such as a display screen, including touch display screens or multitouch display screens, keyboard or other input devices, microphones, speakers, etc. In other embodiments, the system 500 may be any type of computing system (e.g. desktop personal computer, server, laptop, workstation, net top etc.). Peripherals 520 may thus include any networking or communication devices necessary to interface two computer systems. Note that a computer system may in various embodiments include two or more computer systems networked together.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a processor; and
a memory having stored thereon instructions that are executable by the processor to cause the system to perform operations comprising:
training a machine learning model using a plurality of data records, the plurality of data records each containing a respective plurality of data values for a plurality of features, wherein the training the machine learning model comprises training a gradient boosting tree (GBT) model by creating a first decision tree, then iteratively creating a series of additional decision trees based on errors observed from a most recently created tree;
calculating, for each of the features of the plurality of features, a relative weight for that feature and an average value for that feature across the plurality of data records;
receiving a data sample for the machine learning model, the data sample having the plurality of features;
determining, for each feature of the data sample, a deviation from the calculated average value;
producing a result from the machine learning model using the data sample; and
identifying, based on the calculated relative weights and the determined deviations from the calculated average values, a feature that had a greatest influence compared to a rest of the features in the machine learning model producing the result.

2. The system of claim 1, wherein calculating the relative weight for each feature is based on a determined modeling error for that feature.

3. The system of claim 2, wherein the operations further comprise: determining the modeling error for each feature, including:
   feeding a range of values into the machine learning model for that feature, while maintaining known values for all other features; and
   measuring a variance in the output of the machine learning model based on the range of values.

4. The system of claim 1, wherein the operations further comprise:
   acquiring transaction history for an electronic payment transaction account, wherein the electronic payment transaction account is usable to transfer currency to other users using email addresses for the other users; and
   including the transaction history in the data sample.

5. The system of claim 1, wherein the system comprises a plurality of computing devices configured to communicate with one another via a network.

6. The system of claim 1, wherein the identifying comprises determining an influence of each feature in the machine learning model producing the result by multiplying, for each feature, the calculated relative weight with the determined deviation from the calculated average value.

7. The system of claim 1, wherein the producing the result comprises calculating a credit score.

8. A method, comprising:
   receiving, at a computer system, a data sample for a machine learning model, wherein the machine learning model has been trained using a plurality of data records, the records each containing a respective plurality of data values for a feature set having a plurality of features, and wherein the machine learning model has been trained as a gradient boosting tree (GBT) model by creating a first decision tree, then iteratively creating a series of additional decision trees based on errors observed from a most recently created tree;
   producing, by the computer system, a result from the machine learning model using the data sample;
   determining, by the computer system, based on calculated relative weights and deviations from average values of the features in the data sample, one or more of the features that had a greater influence in the machine learning model producing the result than a rest of the features; and
   transmitting, by the computer system, information indicating the one or more features that had the greater influence in the machine learning model producing the result.

9. The method of claim 8, further comprising taking an action based on the result of the machine learning model.

10. The method of claim 9, wherein the action is an adverse credit decision.

11. The method of claim 8, further comprising:
    receiving, by computer system, external data from an outside database; and
    including the external data in the data sample prior to using the data sample with the machine learning model.

12. The method of claim 8, wherein the transmitting comprises transmitting the information to an address provided by an applicant in a new credit application.

13. The method of claim 8, further comprising:
    acquiring credit history for an applicant from a credit bureau; and
    including the credit history in the data sample.

14. The method of claim 8, further comprising:
    sending a particular transmission including the result from the machine learning model; and
    in reply to the particular transmission, receiving an indication that an application for an entity associated with the data sample is being denied;
    wherein determining is performed based on receiving the indication.

15. The method of claim 8, wherein the determining comprises determining an influence of each feature in the machine learning model producing the result by multiplying, for each feature, the relative weight with the deviation from the average value.

16. A non-transitory computer-readable medium having stored thereon instructions that are executable by a system to cause the system to perform operations comprising:
    training a gradient boosting tree (GBT) model as a machine learning model, wherein the GBT model is trained by creating a first decision tree, then iteratively creating a series of additional decision trees based on errors observed from a most recently created tree, and wherein the GBT model is trained using a plurality of data records, the records each containing a respective plurality of data values for a feature set having a plurality of features;
    calculating, for each feature of the plurality of features, a relative weight for that feature and an average value for that feature across the plurality of data records;
    receiving a data sample for the GBT model, the data sample having the plurality of features;
    determining, for each feature of the data sample, a deviation from the calculated average value;
    producing a result from the GBT model using the data sample; and
    identifying, based on the calculated relative weights and the determined deviations from the calculated average values, a feature that had a greater influence than a rest of the features in the machine learning model producing the result.

17. The non-transitory computer-readable medium of claim 16, wherein the operations further comprise:
    transmitting information indicating at least the feature that had the greater influence in the machine learning model producing the result.

18. The non-transitory computer-readable medium of claim 16, wherein the identifying is performed responsive to an indication that an adverse action is being taken against an individual based on the result from the GBT model, wherein information for the individual is included in the data sample.

19. The non-transitory computer-readable medium of claim 16, wherein the operations further comprise:
    processing a plurality of data samples using the GBT model; and
    skipping the identifying for data samples that pass an approval process.

20. The non-transitory computer-readable medium of claim 16, wherein the identifying comprises determining an influence of each feature in the GBT model producing the result by multiplying, for each feature, the calculated relative weight with the determined deviation from the calculated average value.

* * * * *